United States Patent [19]

Lindström

[11] Patent Number: 5,090,967
[45] Date of Patent: Feb. 25, 1992

[54] METHOD AND COMPOSITION FOR PROVIDING AN IMPROVED COMBUSTION IN PROCESSES OF COMBUSTION CONTAINING HYDROCARBON COMPOUNDS

[76] Inventor: Arne Lindström, Ragesås 9792 442 90, Kungälv, Sweden

[21] Appl. No.: 547,323

[22] PCT Filed: Nov. 12, 1986

[86] PCT No.: PCT/SE86/00515
§ 371 Date: May 9, 1989
§ 102(e) Date: May 9, 1989

[87] PCT Pub. No.: WO88/03550
PCT Pub. Date: May 19, 1988

Related U.S. Application Data

[63] Continuation of Ser. No. 358,365, May 9, 1989, abandoned.

[30] Foreign Application Priority Data

May 14, 1985 [SE] Sweden .................................. 8502388

[51] Int. Cl.$^5$ ............................................... C10L 1/18
[52] U.S. Cl. ....................................................... 44/322
[58] Field of Search ..................... 44/322; 252/186.28, 252/186.43

[56] References Cited

U.S. PATENT DOCUMENTS

| 4,045,188 | 8/1977 | Hirchez | 44/77 |
| 4,185,960 | 1/1980 | Brichard et al. | 252/186.43 |
| 4,294,586 | 10/1981 | Cox | 44/77 |
| 4,298,351 | 11/1981 | Earle | 44/77 |
| 4,359,969 | 11/1982 | Mellovist et al. | 44/53 |
| 4,386,938 | 6/1983 | Earle | 44/77 |
| 4,406,254 | 9/1983 | Harris et al. | 44/322 |
| 4,406,812 | 9/1983 | Childers | 252/186.28 |
| 4,684,373 | 8/1987 | Vataru et al. | 44/322 |
| 4,797,134 | 1/1989 | Vataru | 44/322 |

FOREIGN PATENT DOCUMENTS

| 0188786 | 7/1986 | European Pat. Off. |  |
| 0189642 | 8/1986 | European Pat. Off. |  |
| 2406723 | 5/1979 | France |  |
| 0105569 | 8/1975 | Japan | 44/77 |
| 1325183 | 7/1987 | U.S.S.R. |  |
| 673125 | 11/1949 | United Kingdom | 44/77 |

Primary Examiner—Prince Willis, Jr.
Assistant Examiner—Ellen McAvoy
Attorney, Agent, or Firm—Ostrolenk, Faber, Gerb & Soffen

[57] ABSTRACT

A method and a composition for providing an improved combustion containing hydrocarbon compounds in order to reduce the content of injurious substances in the exhaust gases/discharges, at which a liquid composition containing 10-80% by volume of a peroxide or peroxo compound is added to the air of combustion or the fuel-air mixture respectively.

18 Claims, No Drawings

METHOD AND COMPOSITION FOR PROVIDING AN IMPROVED COMBUSTION IN PROCESSES OF COMBUSTION CONTAINING HYDROCARBON COMPOUNDS

This is a continuation of application Ser. No. 07/358,365 filed on May 9, 1989, now abandoned.

TECHNICAL FIELD

The present invention refers to a method and a liquid composition which initiates and optomizes processes of combustion containing hydrocarbon compounds and by that reduces the content of injurious substances in the exhaust gases or discharges, at which a liquid composition containing a peroxide or peroxo compound is supplied to the air of combustion or the fuel-air mixture.

BACKGROUND OF THE INVENTION

In recent years attention has been paid to the environmental contamination and the high energy consumption especially due to the dramatically occuring forest death. Exhaust gases have however always been a problem in population centers. Despite continuously improved engines and heating techniques with less discharges or exhaust gases, the increasing numbers of vehicles and incineration plants have resulted in a total increase of the amount of exhaust gases.

The primary cause of impure exhaust gases and high energy consumption is insuffcent combustion. The construction of the combustion process, the efficiency of the ignition system, the quality of the fuel and the fuel-air mixture determines how effective the combustion becomes and how much uncombusted and dangerous substances the gases contain. Different techniques are used for reducing the amount of the substances, for examples recirculation systems and the well known catalyst technique, which provides a combustion of the exhaust gases outside the actual combustion process.

Combustion is the reaction of a substance with oxygen ($O_2$) with generation of heat. Substances like carbon (C), hydrogen gas ($H_2$), hydrocarbons and sulphur (S) generate sufficent heat for maintaining their combustion temperature while for example nitrogen gas ($N_2$) requires a supply of heat for being oxidized.

At a high temperature, 1200°–2500° C. and a sufficient amount of oxygen a complete combustion is achieved, i.e. each substance takes up a maximum amount of oxygen. The end products are $CO_2$ (carbon dioxide), $H_2O$ (water), $SO_2$ and $SO_3$ (sulphur oxides) and somewhat NO and $NO_2$ (nitrogen oxides, NOx). The sulphur and nitrogen oxides are responsible for a great deal of the acidification of the environment; they are injurious to inhale and especially the later steals energy from the combustion process.

It is also possible to obtain cold flames, for example the blue, flattering flame from a candle which is going out, where the temperature is only about 400° C. The oxidation will then not be complete but the end products can be $H_2O_2$ (hydrogen peroxide), CO (carbon monoxide) and possibly C (soot). The two last mentioned substances are, like NO, injurious and can give off more energy at a complete combustion.

Petrol is a mixture of hydrocarbons from crude oil with a boiling point in the interval 40°–200° C. About 2000 different hydrocarbons with 4–9 carbons are contained therein.

The detailed combustion process is very complicated also for simple substances. The fuel molecules are decomposed to smaller units, of which most are so called free radicals, i.e. unstable molecules which quickly react with for example oxygen.

The most important radicals are the oxygen atom O: the hydrogen atom H and the hydroxyl radical OH. Especially the latter is of greatest importance for decomposing and oxidizing the fuel both through directly bonding to this and by removing hydrogen at which water is formed.

In the beginning of the initiation of the combustion water is decomposed from these according to the reaction $$H_2O + M \rightarrow H. + OH. + M$$

where M is another molecule for example nitrogen or a wall or a spark plug electrode with surface which the water collides. Since water is a very stable molecule a high temperature is required for the decomposition to take place. The better alternative is to add hydrogen peroxide which is decomposed in a similar way:

$$H_2O_2 + M \rightarrow 2OH. + M$$

This reaction takes place much easier and at a lower temperature, especially on surfaces at which the ignition of the fuel-air mixture occurs easier and in a more controlled way. A further positive effect of the reaction of a surface is that hydrogen peroxide easily reacts with soot and tar on walls and spark plugs to carbon dioxide ($CO_2$) which gives clean electrode surfaces and a better spark.

If both hydrogen peroxide and water is added a drastic reduction of CO in the exhaust gases is provided according to the following:

| | |
|---|---|
| $CO + O_2 \rightarrow CO_2 + O$: initiation | 1) |
| $O. + H_2O \rightarrow 2OH.$ branching | 2) |
| $OH. + CO \rightarrow CO_2 + H.$ propagation | 3) |
| $H. + O_2 \rightarrow OH. + O$: branching | 4) |

From the reaction 2) we can see that water plays a catalyzing role by later being reformed. Due to that hydrogen peroxide gives a many thousand times higher content of OH-radicals than water step 3) will be considerably accelerated and remove the most of CO formed. By that additional energy is set free which helps to maintain the combustion.

NO and $NO_2$ are very poisonous compounds, about four times as poisonous as carbon monoxide. At an acute poisoning the lung tissues are injured. NO is a non-desired by-product of combustion. In the presence of water NO is oxidized to $HNO_3$ and contributes in this form to about half of the acidification, the other half being caused by $H_2SO_4$. A problem is that NOx can decompose ozone in the upper part of the atmosphere.

A great part of NO comes from the reaction between the oxygen and nitrogen of the air at a high temperature and is therefore independent of the composition of the fuel. How much NOx that is formed is besides dependant of during which conditions the combustion takes place. If the temperature reduction can take place very slowly this leads to an equilibrum at moderate high temperatures and a lower final concentration of NO.

The following methods can be used for keeping the formation of low NO
1. Combustion in two steps of a fuel rich mixture
2. Low combustion temperature through
   a) high excess of air
   b) strong cooling
   c) re-circulation of the combustion gases In the chemical analysis of flames it has often been observed that the concentration of NO in the flame is much higher than thereafter. There is a process which decomposes NO. A probable reaction is:

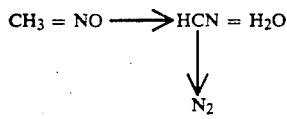

Thus the formation of $N_2$ is supported by conditions which give high concentrations of $CH_3$, viz. a hot, fuel rich flame.

Fuels containing nitrogen, for example in the form of heterocyclic hydrocarbons like pyridine from experience gives off more NO.

The content of N in different fuels (approximatively):

| | |
|---|---|
| Crude oil | 0.65% |
| Asphalt | 2.30% |
| Heavy oils | 1.40% |
| Light oils | 0.07% |
| Carbon | 1-2% |

In SE-B-429.201 there is disclosed a liquid composition containing 1-10% by volume of hydrogen peroxide, at which the residual amount consists of water, aliphatic alcohol and lubricating oil and possibly a corrosion inhibitor, said liquid composition being supplied to the combustion air or the fuel-air mixture. At such low contents of hydrogen peroxide an insufficient amount of OH-radicals are formed for reaction both with the fuel and the CO formed. Besides there is no self-ingnition of the fuel obtained, at which the improvement of the combustion which is achieved as compared to the addition of only water is small.

In DE-A-2.362.082 there is described admixture of an oxidizing agent, for example hydrogen peroxide, in connection with combustion, however the hydrogen peroxide is decomposed to water and oxygen by means of a catalyst before it is supplied to the combustion air.

THE PURPOSE AND MOST IMPORTANT FEATURES OF THE INVENTION

The object of the present invention is to provide an improved combustion and by that a reduction of the discharge of injurious exhaust gases in connection with combustion processes containing hydrocarbon compounds, by an improved initiation of the combustion and maintainance of an optimum and complete combustion under so favourable conditions that the content of injurious exhaust gases is strongly reduced. This has been achieved by the fact that to the combustion air or the fuel-air mixture there is supplied a liquid composition containing a peroxide or peroxo compound and water, at which a liquid composition is chosen which contains 10-80% by volume of the peroxide or peroxo compound.

DESCRIPTION OF THE INVENTION

Under alkaline conditions hydrogen peroxide is decomposed to hydroxyl radicals and superoxide ions according to $$H_2O_2 + HO_2^- \rightarrow HO\cdot + O_2^- + H_2O$$

The hydroxyl radicals which are formed can on one hand react with themselves and on the other hand with the superoxide ions or with hydrogen peroxide. These reactions involve that in turn hydrogen peroxide, oxygen gas and hydroperoxide radicals are formed according to the following reaction formulas:

$$HO\cdot + HO\cdot \rightarrow H_2O_2$$

$$HO\cdot + O_2^-\cdot \rightarrow {}^3O_2 + OH^-$$

$$HO\cdot + H_2O_2 \rightarrow HO_2\cdot + H_2O$$

It is known that pKa for the hydroperoxide radical is 4.88±0.10, which means that all hydroperoxide radicals are dissociated to superoxide ions. Superoxide ions can also react with hydrogen peroxide, with themselves or act as catchers of singlett oxygen formed.

$$O_2^-\cdot + H_2O_2 \rightarrow O_2 + HO\cdot + OH^-$$

$$O_2^-\cdot + O_2^-\cdot + H_2O \rightarrow {}^1O_2 + HO_2^- + OH^-$$

$$O_2^-\cdot + {}^1O_2 \rightarrow {}^3O_2 + O_2^-\cdot + 22\ \text{kcal}$$

Thus there is formed oxygen gas and hydroxyl radicals and singlett oxygen and hydrogen peroxide and triplett oxygen and an energy waste of 22 kcal. It has also proved that heavy metal ions present at the catalytic decomposition of hydrogen peroxide gives hydroxyl radicals and superoxide ions.

From what has been said and known before, the following knowledge about the ccoefficients of velocity is presented, for example as follows with a typical alkane from petrol.

The coefficients of velocity for attacking n-octane with H, O and OH;

| | $k = A \exp(E/RT)$ | |
|---|---|---|
| Reaction | $A(cm^3/mol\cdot s)$ | $E(kJ/mol)$ |
| $n\text{-}C_8H_{18}$ + H | $7.1 \cdot 10^{14}$ | 35.3 |
| + O | $1.8 \cdot 10^{14}$ | 19.0 |
| + OH | $2.0 \cdot 10^{13}$ | 3.9 |

From the example we can see that the attack from the OH-radical can take place quicker and at a lower temperature than from H and O.

The coefficients of velocity for $CO + OH \rightarrow CO_2 + H$ has an unusual temperature dependence through its negative activation energy and high coefficient of temperature. It can be written $4.4 \cdot 10^6 T^{1.5} \exp(3.1/RT)$. The reaction velocity will then be almost constant about $10^{11}$ cm$^3$/mol·s at temperatures lower than 1000° K., i.e. all the way down to room temperature. At higher temperatures than 1000° K. the reaction velocity is increased sometimes. Thanks to this, reaction is the completely dominating for converting CO to $CO_2$ at combustion of hydrocarbons. The early and complete combustion of CO improves by that the thermal efficiency.

An example illustrates the antagonism between $O_2$ and OH are the reactions $NH_3 — H_2O_2 — NO$ where an addition of H₂O₂ gives a 90% reduction of NOx in oxygen-free environment. If on the other hand O₂ is present, even at only 2%, the NOx reduction is drastically detoriated.

For providing OH-radicals according to the invention H₂O₂ is used which is dissociated at about 500° C. They have a life time of maximum 20 ms.

At a normal combustion of ethanol 70% of the fuel is consumed by a reaction with OH-radicals and 30% with H-atoms. The invention which already at the initiation of the combustion supplies OH-radicals improves the combustion dramatically by immediately attacking the fuel. By adding a liquid composition with a high content of hydrogen peroxide (over 10%) there is yet sufficient OH-radicals for immediately oxidizing the CO formed. At lower contents of hydrogen peroxide there are not sufficient OH-radicals formed for reacting both the fuel and with the CO.

The liquid composition is supplied so that there will be no chemical reaction, from the liquid container to the combustion room, i.e. decomposition of hydrogen peroxide to water and oxygen gas will not take place but the liquid will in intact condition reach the combustion directly or alternatively to a prechamber were a mixture of the liquid and the fuel is ignited outside the actual combustion room.

If the concentration of hydrogen peroxide is sufficiently high (about 35%) a self-ignition of the fuel can take place as well as maintainance of the combustion.

The ignition of the liquid-fuel mixture can take place through self ignition or by contact with a catalyzing surface, at which spark plugs or the like are not required. The ignition can also take place through ignition with heat energy, for example a spark plug, glow body, open flame or the like.

Admixture of an aliphatic alcohol to hydrogen peroxide can initiate self-ignition. Especially in pre-chamber systems this can be desireable, at which the hydrogen peroxide and the alcohol may not be allowed to mix before they reach the pre-chamber.

By arranging an injection valve for the liquid composition for each cylinder a very exact and for all service conditions adapted dosing of the liquid is provided. By means of a control unit which controls the injection valves and a number of signal transmittors connected to the motor, which gives signals to the control unit representing the position of the crank axel, motor speed and load and possibly also the temperature of the ingas, there is made possible a sequential injection and synchronization with the opening and closing of the injection valves and dosing of the liquid not only dependent on the load and desired power output, but also of the motor speed and the temperature of the injection air, which gives a good runnability under all conditions. The liquid mixture to a certain degree replaces the air supply.

A number of comparative tests have been performed for finding out the differences in effect between water and hydrogen peroxide mixtures (23- respectively 35%). The loads which were chosen correspond to driving on motor highways and in cities. The test motor was a B20E connected to a waterbrake. The motor was warmed up before the tests started.

At motor highway load the emissions of NOx as well as CO and HC increased when hydrogen peroxide was exchanged for water. The contents of NOx were reduced with an increased amount of hydrogen peroxide. Also water reduced the NOx-contents, however at this load four times as much water as 23% hydrogen peroxide was required for achieving the same reduction of the NOx-contents.

In city-traffic load 35% hydrogen peroxide was firstly supplied, at which the motorspeed and moment were somewhat increased (20-30 RPM/0.5-1 Nm).

At a change to 23% hydrogen peroxide the motor speed and moment were decreased at the same time as the NOx-content was increased. When supplying pure water it was difficult to keep the motor running. The HC-content was strikingly increased.

Thus the hydrogen peroxide improved the combustion at the same time as the NOx-contents were reduced. Tests performed at the Swedish Motor-vehicle Inspectorate on a SAAB 900i and a Volvo 760 Turbo with and without a mixture to the fuel of 35% hydrogen peroxide gave the following results with respect to the emission of CO, HC, NOx and CO₂. The percentage states the result obtained with a mixture of hydrogen peroxide in relation the result without a mixture.

| SAAB 900i | | | | | | | | | |
|---|---|---|---|---|---|---|---|---|---|
| Cold starting | | Warm starting | | Warm driving | | Idle running | | HCD (road driving) | |
| CO: | −23% | CO: | −54% | CO: | −76% | CO: | −90% | CO: | −41% |
| HC: | +6% | HC: | ±0% | HC: | −7% | HC: | −50% | HC: | +8% |
| NOx: | −25% | NOx: | −12% | NOx: | −23% | | | NOx: | −15% |
| CO₂: | +33% | CO₂: | +4% | CO₂: | +5% | | | CO₂: | +3% |

| VOLVO 760 Turbo | | | |
|---|---|---|---|
| Idle running | | Warm driving | |
| CO: | −73% | CO: | −54.3% |
| HC: | −18% | HC: | −2.3% |
| NOx: | −21% | NOx: | −8.3% |

At tests performed with a Volvo 245 GL 4FK/84 the car had at idle running a CO-content of 4% and a HC-content of 65 ppm without pulse air (exhaust gas cleaning). With the admixture of a 35% solution of hydrogen peroxide the CO-content was reduced to 0.05% and the HC-content to 10 ppm. The ignition timing was 10° and the idling R.P.M. was 950 in both cases.

At tests performed by the Norwegian Marine Technichal Research Institute A/S in Trondheim the emission of HC, CO and NOx was examined for a Volvo 760 Turbo after ECE-Regulation No. 15.03 with warm engine at starting with and without a mixture of a 35% solution of hydrogen peroxide to the combustion.

| Test results: | | ECE 15.03 | Idle running |
|---|---|---|---|
| Without hydrogen peroxide | HC | 4.3 g/test | 340 ppm |
| | CO | 70 g/test | 0.64% |
| | NOx | 4.8 g/test | 92 ppm |
| With admixture of a 35% | HC | 4.2 g/test | 280 ppm |
| solution of hydrogen per- | CO | 32 g/test | 0.17% |

| Test results: | | ECE 15.03 | Idle running |
|---|---|---|---|
| oxide | NOx | 4.4 g/test | 73 ppm |

Only the use of hydrogen peroxide has been mentioned above. It can however be assumed that a corresponding effect is achieved also with other peroxides and peroxo compounds inorganic as well as organic.

The liquid composition can besides peroxide and water also contain up to 70% of an aliphatic alcohol with 1-8 carbons and up to 5% of an oil containing a corrosion inhibitor.

The amount of a mixture of the liquid composition to the fuel can very from some tenth part of the percent liquid composition per amount of fuel up to some hundred %. The higher amounts are used i.a. for fuels which are difficult to ignite.

The liquid composition is intended to be used in combustion engines and other combustion processes containing hydrocarbon compounds like oil, coal, biomass etc. in combustion furnaces for providing a more complete combustion and a reduction of the contents of injurious substances in the discharges.

I claim:

1. A method for providing an improved combustion in processes of combustion containing hydrocarbon compounds in order to reduce the content of injurious substances in the exhaust gases/discharges, comprising the step of adding a liquid composition containing a peroxide or peroxo-compound and water to the air of combustion or the fuel-air mixture respectively, characterized in that said liquid composition contains more than 10 and up to 80% by volume peroxide or peroxo-compound, and is introduced into the combustion chamber or alternatively is introduced into a pre-chamber, where a mixture of the fuel and the liquid composition is ignited outside the acutal combustion chamber, said introduction being separate from the fuel whereby it is without previous decomposition of the peroxide or peroxo-compound.

2. A method as claimed in claim 1, characterized in that an aliphatic alcohol with 1-8 carbons is introduced into the pre-chamber separately and which alcohol when mixed with the liquid composition causes self ignition of the fuel.

3. A method according to claim 1, characterized in that said liquid is an aqueous liquid.

4. A method as claimed in claim 3, characterized in that said liquid contains up to 70% of an aliphatic alcohol with 1-8 carbons.

5. A method according to claim 3, characterized in that said liquid contains up to 5% of an oil containing a corrosion inhibitor.

6. A method as claimed in claim 3, characterized in that said liquid contains at least 30% peroxide or peroxo compound.

7. A method as claimed in claim 3, characterized in that said peroxide is hydrogen peroxide.

8. A method according to claim 4, characterized in that said liquid contains up to 5% of an oil containing a corrosion inhibitor.

9. A method as claimed in claim 4, characterized in that said liquid contains at least 30% peroxide or peroxo compound.

10. A method as claimed in claim 5, characterized in that said liquid contains at least 30% peroxide or peroxo compound.

11. A method as claimed in claim 4, characterized in that said peroxide is hydrogen peroxide.

12. A method as claimed in claim 5, characterized in that said peroxide is hydrogen peroxide.

13. A method as claimed in claim 6, characterized in that said peroxide is hydrogen peroxide.

14. A method as claimed in claim 1, characterized in that said liquid composition comprises water, said peroxide or peroxo compound, up to 70% of an aliphatic alcohol with 1-8 carbons and up to 5% of an oil containing a corrosion inhibitor.

15. A method as claimed in claim 14, characterized in that said peroxide is hydrogen peroxide.

16. A method as claimed in claim 15, characterized in that said liquid composition contains at least 30% peroxide.

17. A method as claimed in claim 3, characterized in that said liquid composition contains at least 23% peroxide.

18. A method as claimed in claim 1, characterized in that said liquid contains at least 23% peroxide.

* * * * *